United States Patent [19]

Yoshizawa et al.

[11] Patent Number: 4,769,641

[45] Date of Patent: Sep. 6, 1988

[54] PAGER RECEIVER CAPABLE OF AVOIDING AN UNPLEASING INTERRUPTION OF A DISPLAYED MESSAGE

[75] Inventors: Shigeo Yoshizawa; Takashi Ohyagi; Takashi Oda; Toshihiro Mori, all of Tokyo, Japan

[73] Assignee: NEC Corporation, Japan

[21] Appl. No.: 59,207

[22] Filed: Jun. 2, 1987

Related U.S. Application Data

[63] Continuation of Ser. No. 656,087, Sep. 28, 1984, abandoned.

[30] Foreign Application Priority Data

Sep. 30, 1983 [JP] Japan ................................. 58-180383
Sep. 30, 1983 [JP] Japan ................................. 58-180386

[51] Int. Cl.[4] .............................................. H04Q 1/00
[52] U.S. Cl. ........................ 340/825.44; 340/825.45; 340/825.47; 340/825.48
[58] Field of Search ............................... 364/200, 900; 340/311.1, 825.44, 825.45–825.48, 825.5; 455/31, 89

[56] References Cited

U.S. PATENT DOCUMENTS

| | | | |
|---|---|---|---|
| 3,976,995 | 8/1976 | Sebestyen | 340/825.44 |
| 4,197,526 | 4/1980 | Levine et al. | 340/825.44 |
| 4,383,257 | 5/1983 | Giallanza et al. | 340/825.44 X |
| 4,385,295 | 5/1983 | Willard et al. | 340/825.44 |
| 4,403,212 | 9/1983 | Masaki | 340/825.44 X |
| 4,412,217 | 10/1983 | Willard et al. | 340/825.44 |
| 4,437,095 | 3/1984 | Akahori et al. | 340/825.44 |
| 4,477,807 | 10/1984 | Nakajima et al. | 340/825.44 |
| 4,477,808 | 10/1984 | Ichikawa | 179/2 EC X |
| 4,517,561 | 5/1985 | Burke et al. | 179/2 EC X |

Primary Examiner—Ulysses Weldon
Attorney, Agent, or Firm—Laff, Whitesel, Conte & Saret

[57] ABSTRACT

In a pager receiver having a display unit and carrying out operations in relation to each of previous and current messages stored in a RAM, only reception of the current message is indicated by an optical indicator included in the display unit when each operation is being carried out in relation to the previous message. The current message is displayed on a LCD of the display unit after completion of each operation related to the previous message. The previous message can completely be displayed without sudden interruption which may occur on reception of the current message. Each message is stored in an assigned sector set of the RAM with the number of the assigned sector set kept in an assigned file of the RAM. The number of the assigned file is monitored by a CPU to readily erase or protect each message.

4 Claims, 12 Drawing Sheets

PAGER RECEIVER CAPABLE OF AVOIDING AN UNPLEASING INTERRUPTION OF A DISPLAYED MESSAGE

This application is a continuation of application Ser. No. 656,087 filed Sept. 28, 1984, now abandoned.

BACKGROUND OF THE INVENTION

This invention relates to a pager receiver or paging receiver operable in a paging system.

A recent technical development has brought about a multifunctional pager receiver which is capable of carrying out various operations in response to a radio calling signal comprising a call number signal and a message signal following the call number signal. The call number signal represents a directory number assigned to each pager receiver to which the message signal should be directed. For use as a multifunctional pager receiver, a conventional pager receiver comprises a storage unit for successively storing the message signals directed thereto and a display unit for providing visual displays of messages carried by the message signals. It is possible with this structure to store a previous one of the message signals for later display on the display unit. Preferably, the previous message signal should optionally be displayed again and again on the display unit or erased from the storage unit.

In such a pager receiver, each operation related to the previous message signal may be called a first operation. The first operation might undesiredly be interrupted on reception of a current message signal even during progress of the first operation in the pager receiver. In other words, a second operation related to the current message signal is carried out in preference to the first operation. However, the undesired interruption of the first operation might confuse the possessor of the pager receiver because the visual displays abruptly disappear from the display unit. In addition, the previous message signals stored in the storage unit are successively erased from the oldest one thereof. In order to preserve each previous message signal and the current message signal without being erased, intricate processing should be carried out in the conventional pager receiver.

SUMMARY OF THE INVENTION

It is an object of this invention to provide a pager receiver wherein an undesired interruption of operation can be avoided during progress of a first operation related to a previous message signal received previous to a current message signal.

It is another object of this invention to provide a pager receiver of the type described, wherein a possessor of the receiver is never confused by the abrupt interruption.

It is a further object of this invention to provide a pager receiver of the type described, which is capable of readily preserving each message signal.

A pager receiver to which this invention is applicable includes an indicating member and capable of selectively carrying out a first operation related to a previous message signal carrying a previous message and a second operation of processing a current message signal which carries a current message and is currently received following the previous message signal. According to this invention, the pager receiver comprises detecting means responsive to the current message signal for detecting whether or not the first operation is still in progress and processing means coupled to the indicating member and operatively to the detecting means and responsive to the current message signal for carrying out the second operation to make the indicating member indicate the current message and reception of the current message signal. The processing means otherwise makes the indicating member indicate only reception of the current message signal and thereafter indicate the current message after progress of the first operation is over.

DESCRIPTION OF THE PREFERRED EMBODIMENTS

Figure 1:
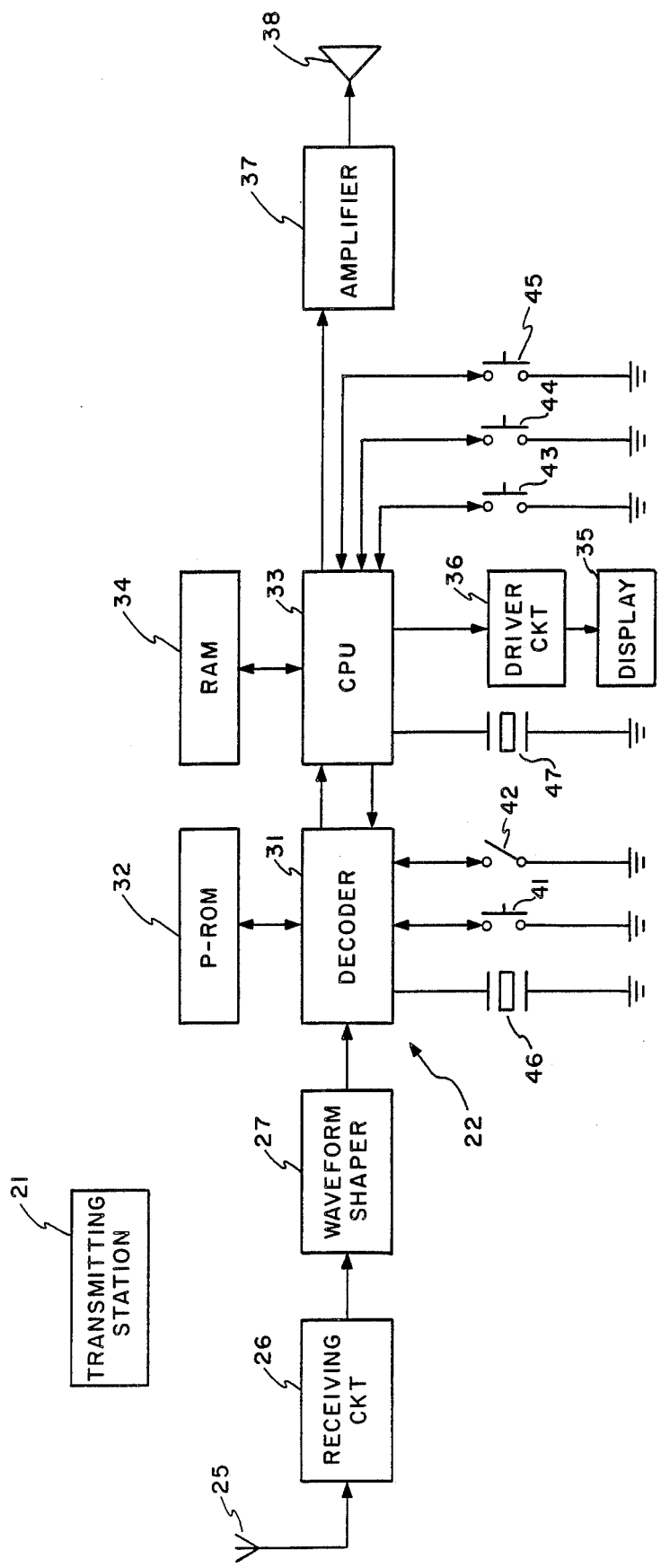
FIG. 1 shows, together with a transmitting station, a pager receiver according to an embodiment of this invention.

Referring to FIG. 1, a paging system comprises a transmitting station 21 having a certain service area. The system further comprises a plurality of pager receivers, one of which is depicted at 22 as a representative of the pager receivers of the system.

A plurality of subscriber substations (not shown) are connected to the transmitting station 21. When a call originates from one of the subscriber substations to the illustrated pager receiver 22, the call is conveyed from the transmitting station 21 to the pager receiver 22 in the form of a radio calling signal.

Figure 2:
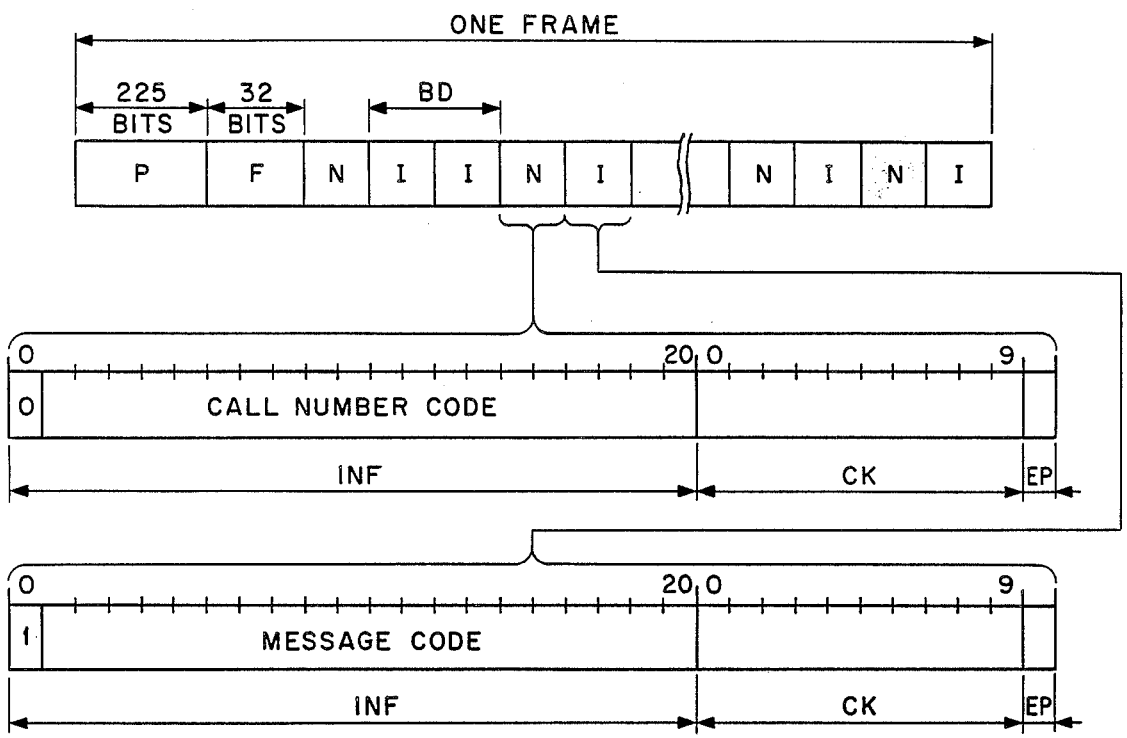
FIG. 2 is a signal format for use in describing operation of the pager receiver illustrated in FIG. 1.

Turning to FIG. 2 for a short while, each frame of the radio calling signal comprises a preamble signal P of p bits and a frame synchronizing code F of f bits as depicted along the top line. The numbers p and f may be, for example, 225 and 32, respectively. The frame synchronizing code F appears at every frame period and is followed by a plurality of call or directory number signals N and a plurality of message signals I. The frame synchronizing code F is used in synchronizing the pager receiver for the call number signals N and the message signals I. A leading one of the call number signals N succeeds immediately after the frame synchronizing code F. A single one of the message signals I usually succeeds each of the call number signals N. However, a specific one of message signals I may be succeeded by another message signal I as shown at a position BD. Consequently, at least one message signal I succeeds each of the call number signals N.

As depicted on a large scale for one of the call number signals N, each call number signal N comprises a call or directory number code in an information bit part INF of twenty-one bits 0 through 20 as will presently be described more in detail. The information bit part INF is followed by a check bit part CK of ten bits 0 through 9 and then by a parity bit part EP of one bit. Each message signal I comprises a message code in a similar information bit part INF which is likewise followed by a check bit part CK and thereafter by a parity bit part EP. As a result, each of the call number signals N and the message signals I has a word length of thirty-two bits.

The information bit part INF and the check bit part CK of each of the call number signals N and the message signals I are given by a Bose-Chaudhuri-Hocquenghem (BCH) codes of (31, 21) known in the art. The parity bit part EP gives a parity bit for the even-number parity check which is also known in the art.

A most significant bit (MSB) of each of the call number signals N and the message signals I is used as an identification (ID) signal in distinguishing between the call number signals N and the message signals I by logic "0" for the call number signals N and by logic "1" for the message signals I. The most significant bit of each of the call number signals N and the message signals I is shared by the information bit part INF as the most significant bit thereof.

In the information bit part INF of the call number signal N, the remaining part except the most significant bit is for use in representing the call number code of twenty bits. In the information bit part INF of the message signal I, the remaining part other than the most significant bit is used in giving the message code. Inasmuch as the message code is twenty bits long, it is possible to transmit a message of a binary-coded decimal number of five or less digits. It is known that one digit of a binary-coded decimal number is given by four bits. When the message to be transmitted has a length between six and ten digits, the message is transmitted by two message signals I as described before in conjunction with the position BD. That is to say, a message code having a length between six and ten digits is transmitted by the use of the message signals I of two words. When the message to be transmitted has a length longer than ten digits, the message can be transmitted by three or more message signals.

Referring back to FIG. 1, the pager receiver 22 comprises an antenna 25 for receiving the radio calling signal and a battery (not shown). An ordinary receiving circuit 26 is for subjecting the received calling signal to frequency conversion, amplification, and demodulation to produce a demodulated calling signal. The receiving circuit 26 comprises a discriminator (not shown) which produces the demodulated calling signal. A waveform shaper 27 is for shaping the waveform of the demodulated calling signal into a reproduction of a digital signal which is produced in the transmitting station 21 for transmission as the radio calling signal. The receiving circuit 26 and the waveform shaper 27 are known in the art. For example, the receiving circuit 26 may be of the type described in U.S. Pat. No. 4,194,153 issued to Masaru Masaki et al and assigned to the present assignee. The waveform shaper may be of the structure comprising a low-pass filter and a comparator.

The reproduction of the digital signal, namely, a reproduced digital signal is supplied from the waveform shaper 27 to a decoder 31. The reproduced digital signal comprises reproductions of the preamble signal P (FIG. 2), the frame synchronizing code F, and the call number code together with reproductions of the message code. For brevity of description, the word "reproduction" or "reproduced" will be omitted hereinafter from the above-mentioned signals and codes so long as no confusion arises.

The decoder 31 cooperates with a P-ROM (programmable read-only memory) 32 for memorizing or storing a number signal representative of an identification or directory number which is specific to the illustrated pager receiver 22. In the manner known in the art, the decoder 31 compares the digital signal delivered from the waveform shaper 27 with the number signal fed from the P-ROM 32. When the digital signal includes a specific call number signal which is coincident with the number signal memorized in the P-ROM 32, the decoder 31 informs a CPU (central processing unit) 33 of the reception of the specific call number signal N. Subsequently, the message signal I is sent through the decoder 31 to the CPU 33. The P-ROM 32 may memorize two call numbers which are an A-calling number and a B-calling number for carrying out the so-called dual calling services.

The CPU 33 decodes the message signal I sent through the decoder 31 and produces a decoded message. When the message signal ends, the CPU 33 sends a message end command back to the decoder 31. The decoded message is memorized in an RAM (random access memory) 34. A display unit 35 is driven by a display driver circuit 36 to provide visual displays of the message to a possessor of the receiver. At the same time, an amplifier circuit 37 make a loudspeaker 38 produce a call or beep tone for informing the possessor of reception of the call number signal. A combination of the display unit 35 and the loudspeaker 38 serves as an indicating member of the pager receiver 22.

The pager receiver further comprises a first switch 41 for manually stopping the call tone and erasing the displayed message. The first switch 41 will be called a reset switch depending on the circumstances. A second switch 42 is for selecting one of normal and special modes. Third through fifth switches 43, 44, and 45 are for selecting any one of various functions which will presently be described. The second through the fifth switches 42 to 45 are therefore mode switches. The normal mode is for memorizing and visually displaying the message on reception of the specific call number signal. The special mode is for memorizing the message on reception of the specific call number signal without displaying the message at once. The functions carried out by the third through fifth mode switches 43 to 45 will later be described.

A first crystal oscillation element 46 is for driving the decoder 31. A second crystal oscillation element 47 is for driving the CPU 33. Although not shown in FIG. 1, a power source switch is included in the illustrated pager receiver for putting the pager receiver into operation by the battery.

Figure 3:
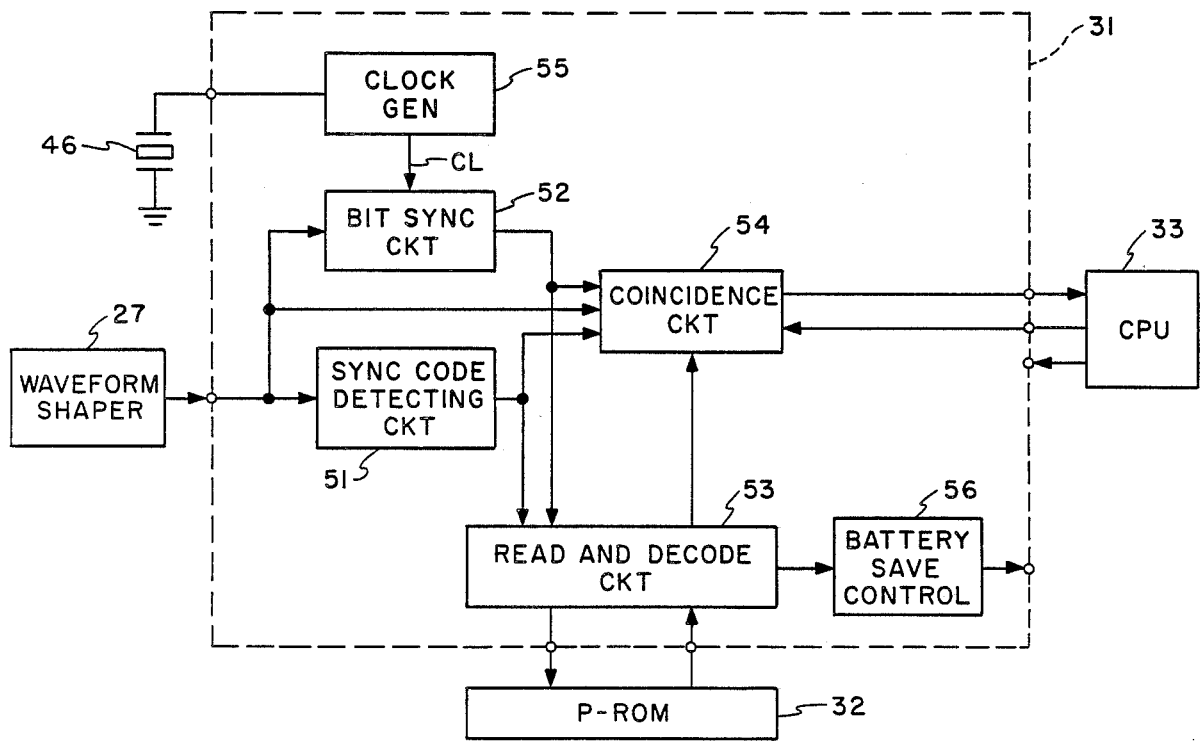
FIG. 3 shows a block diagram of a CPU and a decoder used in the pager receiver illustrated in FIG. 1.

Referring to FIG. 3, the decoder 31 comprises a synchronizing code detecting circuit 51 and a bit synchronizing circuit 52. The circuits 51 and 52 are put into operation so as to establish frame synchronism and bit synchronism in response to the digital signal sent from the waveform shaper 27. After establishment of the frame synchronism and the bit synchronism, a readout enable signal is sent from a read and decode circuit 53 to the P-ROM 32. The number signal read out of the P-ROM 32 is supplied to a coincidence circuit 54 through the read and decode circuit 53 to be compared with the call number signal. The coincidence circuit 54 allows the message signal to pass therethrough when the number signal is coincident with the call number signal. As a result, the message signal is delivered to the CPU 33 which is operable in a manner to be described later.

A clock generator 55 is connected to the first crystal oscillation element 46 and comprises an oscillation circuit and a frequency dividing circuit. The clock generator 55 generates a clock signal CL for use in controlling operation of the decoder 31. The decoder 31 further comprises a battery saving controlling circuit 56 operable in the known manner.

Figure 4:
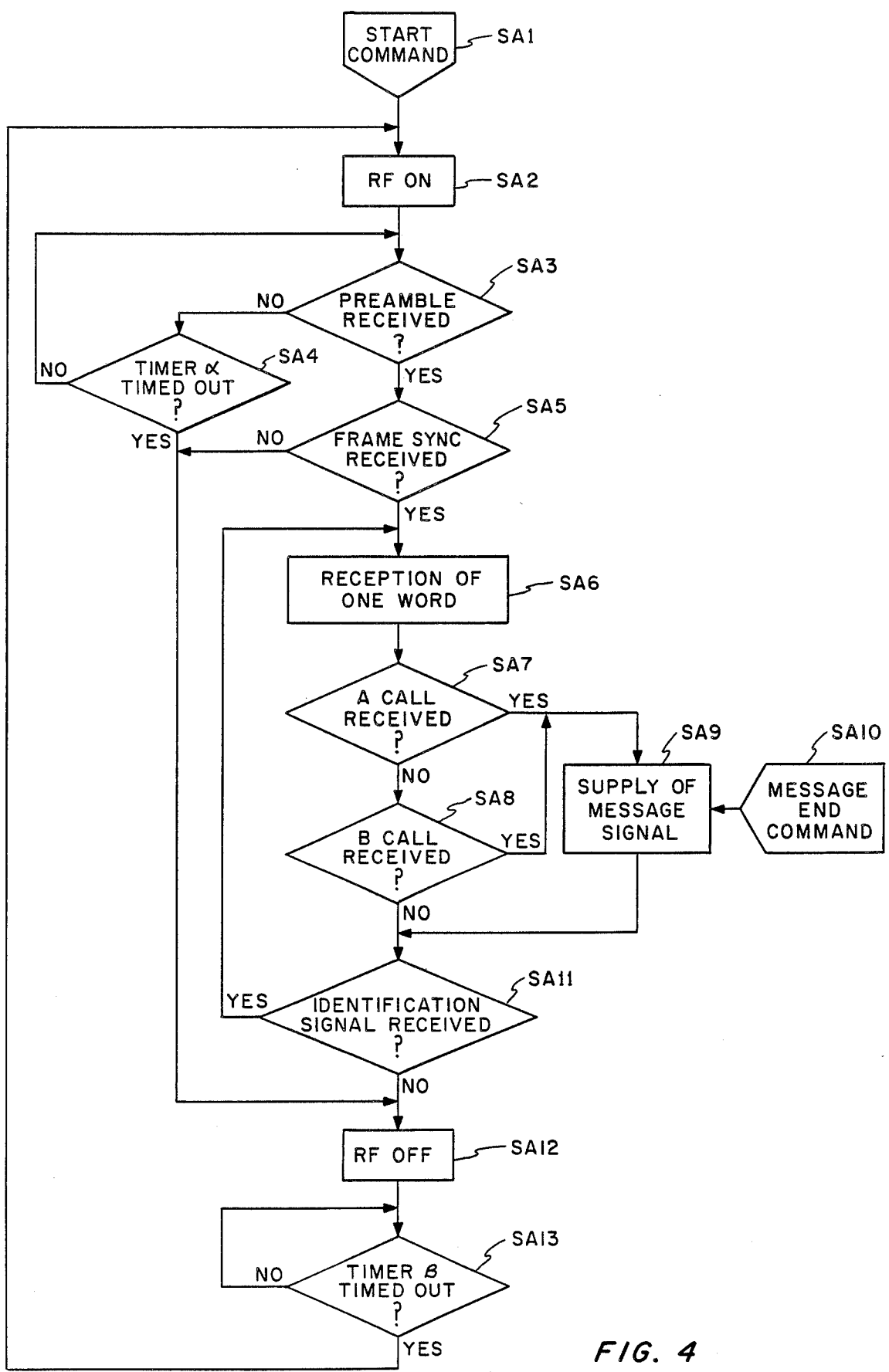
FIG. 4 is a flow chart for use in describing operation of the decoder illustrated in FIG. 4.

Referring to FIG. 4 together with FIG. 3, operation of the decoder 31 will be described in detail. At a first stage SA1, the decoder 31 is energized into an initial state when the CPU 33 delivers a start command to the decoder 31. The first stage SA1 proceeds to a second stage SA2 at which an RF (radio frequency) circuit (not shown) of the receiving circuit 26 is energized so as to receive the preamble signal P of the radio calling signal. The RF circuit is continuously driven thereafter for reception of other signals as will presently be described. The second stage SA2 is followed by a third stage SA3 at which judgment is made about whether or not the preamble signal P is received. When the preamble signal P is not received, the third stage SA3 is followed by a fourth stage SA4 at which judgment is made about whether or not a first predetermined time lapses in a first timer $\alpha$ (not shown).

When the preamble signal P is received while the RF circuit is driven in the third stage SA3, the third stage SA3 is followed by a fifth stage SA5 at which the decoder 31 waits the frame synchronizing code F following the preamble signal P in the digital signal. When the synchronizing code F is received, the fifth stage SA5 is followed by a sixth stage SA6 at which one word of the call number signal is received. The sixth stage SA6 is followed by a seventh stage SA7 and an eighth stage SA8 at which the received call number signal is compared with the A- and the B-calling numbers, respectively. At the result, if the received call number is coincident with either one of the A- and the B-calling numbers, the message signal I is sent to the CPU 33 in a ninth stage SA9. When an end of the message signal is detected by the CPU 33, the above-mentioned message end command is sent from the CPU 33 to the decoder 31 at a tenth stage SA10. The message end command stops sending the message signal. In this event, reception of another identification (ID) signal is checked at an eleventh stage SA11. If not, operation of the RF circuit is turned off at a twelfth stage SA12. If another identification (ID) signal is received, the eleventh stage SA11 returns to the sixth stage SA6 for another word of the message signal I.

The twelfth stage SA12 is followed by a thirteenth stage SA13 at which judgment is made about whether or not a second predetermined time lapses in a second timer $\beta$ (not shown). When the synchronizing code F does not follow, the fifth stage SA5 is succeeded by the twelfth stage SA12. After lapse of the second predetermined time, the thirteenth stage SA13 returns back to the second stage SA2.

Figure 5:
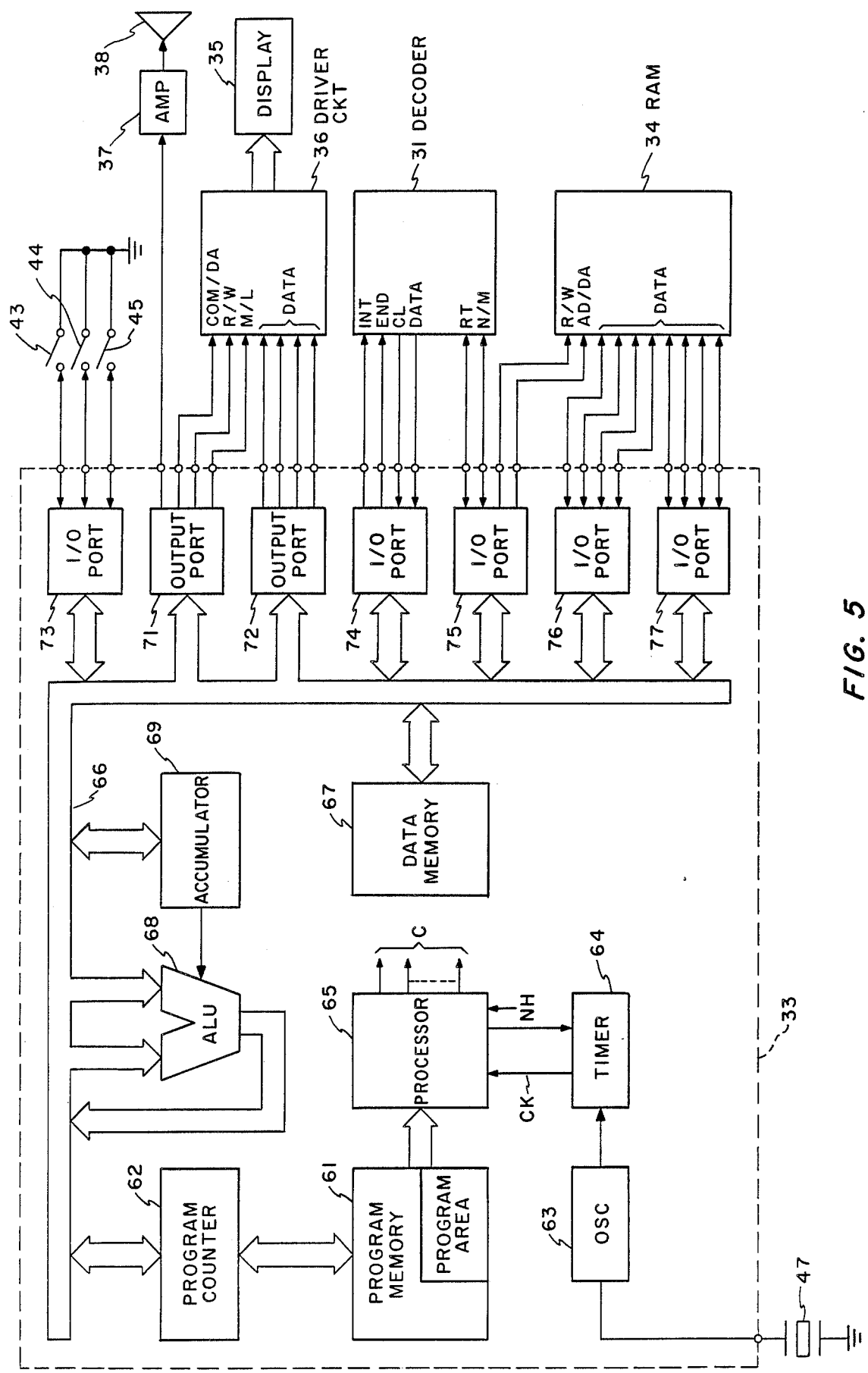
FIG. 5 is a block diagram of the CPU for use in the pager receiver illustrated in FIG. 1.

Referring to FIG. 5, the CPU 33 comprises a program memory 61 for memorizing a predetermined program composed of a succession of instructions and a table for use in translating the message codes into translated or key codes. A synchronizatin pattern is also memorized in the program memory 61 for use in detecting the synchronizing code F (FIG. 2).

A program counter section 62 is coupled to the program memory 61 for use in accessing the program memory 61 by an address signal which is kept in the program counter section 62 as a content thereof. The content of the program counter section 62 is usually counted up by one at every instruction but sometimes rewritten by particular instructions, such as jump instructions or the like. Thus, the program memory 61 produces the instructions and the key codes in accordance with the address signal kept in the program counter section 62.

An oscillator 63 is connected to the second crystal oscillation element 47 and to a timer 64. A combination of the second crystal oscillation element 47, the oscillator 63, and the timer 64 serves to produce a sequence of clock pulses CK.

A processor 65 is put into operation in response to the instructions or the key codes and to the clock pulse sequence CK to deliver various kinds of control signals CS to structural elements included in the CPU 33 in synchronism with the clock pulse sequence CK.

In FIG. 5, the program counter section 62 is coupled through a bus 66 to a data memory 67. In this structure, the program counter section 62 can deliver the address signal kept therein to the data memory 67 under control of the processor 65.

An arithmetic logic unit (ALU) 68 and an accumulator (ACC) 69 are coupled to the bus 66 to execute each instruction, as will become clear as the description proceeds. The accumulator 69 can be loaded through the processor 65 with the key codes and the like in the form of the control signals CS. Therefore, each of the codes is kept in the accumulator 69 in accordance with the address signal indicated by the address counter section 62.

The bus 66 is coupled to first and second ports 71 and 72. Each of the first and the second ports is an output port. The first output port 71 is connected to the amplifier circuit 37 to send a tone signal thereto and to the display driver circuit 36 to send a control signal thereto. The control signal is for controlling command/data (COM/DA), reading/writing (R/W) of the message relating to the driver circuit 36, and start/end (M/L) of the message. The second output port 72 is connected also to the display driver circuit 36 to send the data thereto.

The bus 66 is furthermore coupled to third, fourth, fifth, sixth, and seventh ports 73, 74, 75, 76, and 77 each of which is an input/output port. The third port 73 is connected to the third through the fifth switches 43 to 45 to check the state thereof. The fourth port 74 and two terminals of the fifth port 75 are connected to the decoder 31. The fourth port 74 is for supplying the above-mentioned start command and message end command (INT and END) to the decoder 31 and for receiving the clock signal CL and the message code (DATA) from the decoder 31. The fifth port 75 is for checking the states (RT and N/M) of the first and the second switches 41 and 42. Furthermore, the fifth port 75 is for controlling read/write of the RAM 34 and address/data (AD/DA) thereof. The sixth and the seventh ports 76 and 77 are also connected to the RAM 34 to exchange data therewith.

Figure 6:
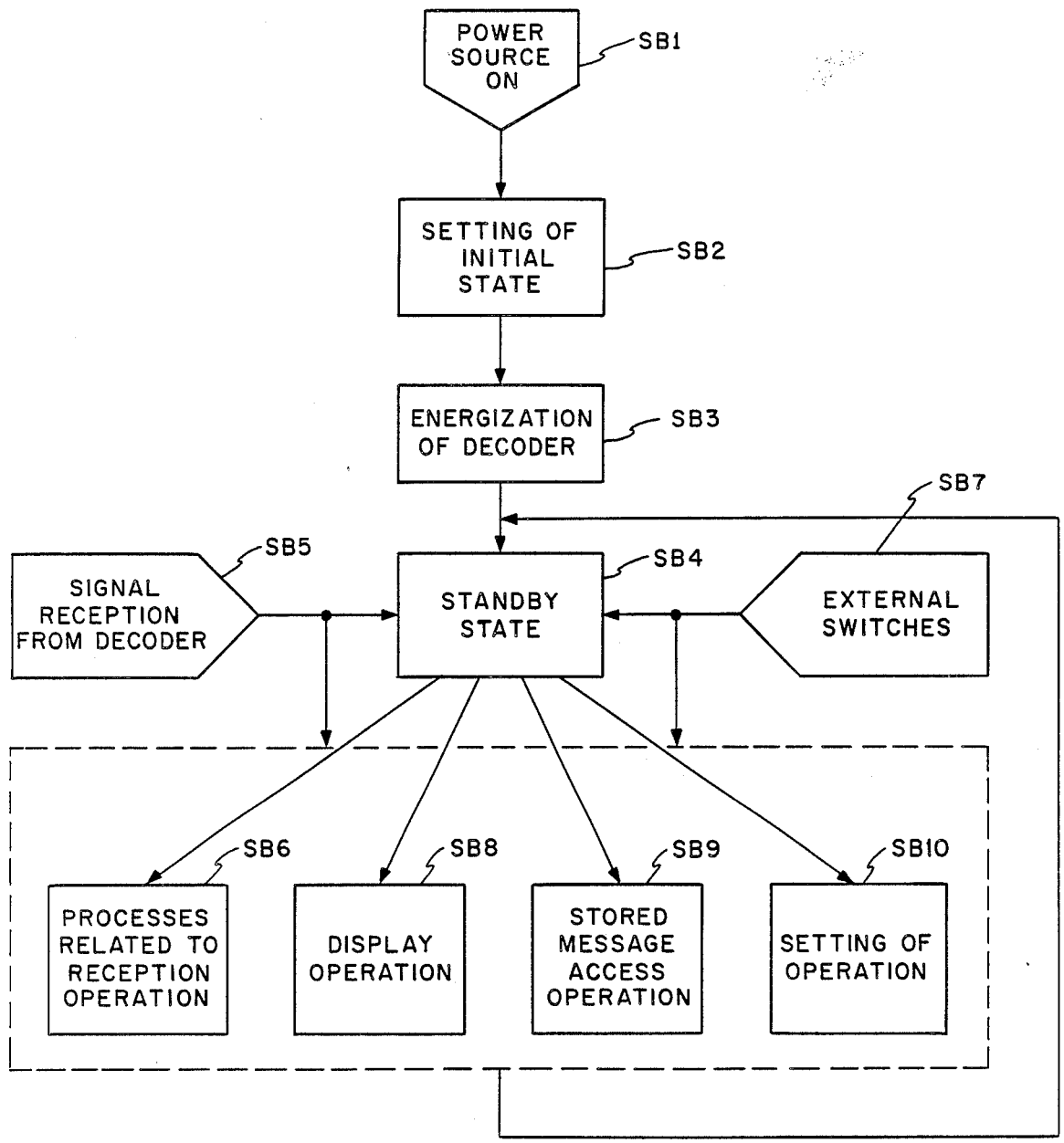
FIG. 6 is a flow chart for use in describing operation of the CPU illustrated in FIG. 5.

Referring to FIG. 6, operation of the CPU 33 will be briefly described. At a first stage SB1, the power source switch (not shown) is turned on. The first stage SB1 proceeds to a second stage SB2 at which various memory devices, counters, and flags are returned to an initial state. The second stage SB2 is followed by a third stage SB3 at which the decoder 31 (FIG. 1) is energized by the start command. The third stage SB3 is followed by a fourth stage SB4 at which the CPU 33 (FIGS. 1 and 5) becomes a waiting or standby state for receiving the digital signal.

When reception of the digital signal is notified from the decoder 31 at a fifth stage SB5, the fourth stage SB4 is followed by a sixth stage SB6 at which the digital signal is processed as will be described hereinafter. When the first and the third through fifth switches 41 and 43 to 45 are selectively operated at a seventh stage SB7, the fourth stage SB4 is followed by one of eighth, ninth, and tenth stages SB8, SB9, and SB10.

At the eighth stage SB8, a message displaying operation or mode is carried out in various manners in relation to messages stored in the RAM 34. More particularly, the displaying operation includes first, second, and third display operations for displaying each message stored in the RAM 34, for repeatedly displaying a preserved one of the stored messages, and for displaying the number of the stored messages, respectively. At the ninth stage SB9, the stored messages are internally processed in the CPU 34 without being displayed on the display unit 35. Such an internal operation may be referred to as a message file access operation or mode and includes operations for erasing each stored message from the RAM and for preserving each stored message in the RAM 34. At the tenth stage SB10, the stored messages are processed in connection with various elements of the pager receiver and external devices externally connected to the pager receiver. More particularly, scroll operation can be indicated at the tenth stage SB10 so as to display the stored messages in a scroll manner. In this case, it is possible to define a time interval for such a scroll display by setting a preselected one of the switches 41 and 43 through 45. In addition, a backup operation can also be indicated by selecting the switches 41 and 43 to 45 so as to back up the RAM 34 when the battery is disconnected from the RAM 34. The backup operation serves to protect the stored messages of the RAM 34 against automatic erasure on exchanging a consumed battery to a new battery. The stored messages can be transferred to the external devices, such as an external memory, an external printer, or an external display device.

The reception operation carried out at the stage SB6 is processed in preference to the other operations carried out at the stages SB8, 9, and 10. As a result, the reception operation is instantaneously started in response to any message signal even when whichever one of the other operations is being carried out at each of the eighth through tenth stages SB8 to SB10.

Figure 7:
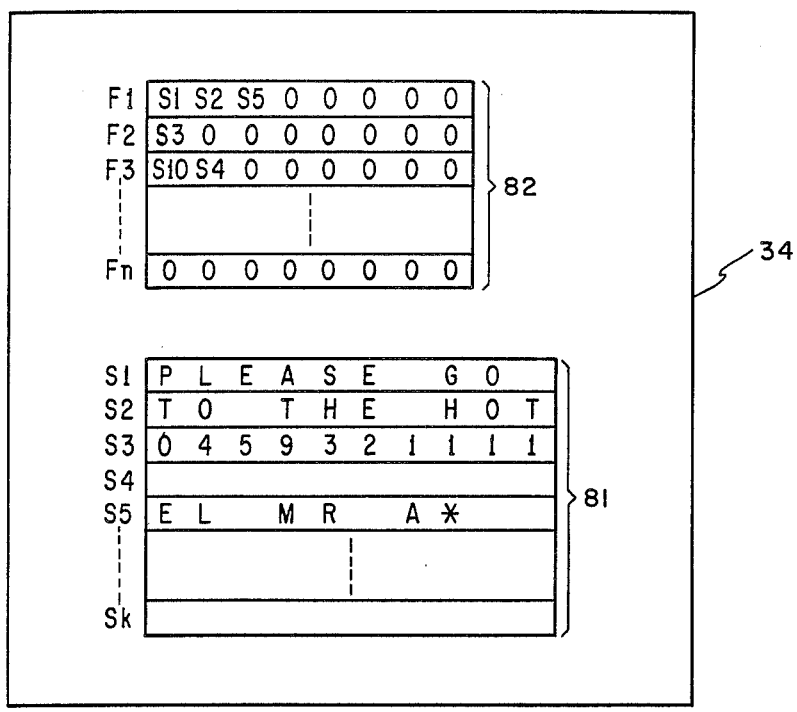
FIG. 7 shows a plurality of memory areas in an RAM used in the pager receiver illustrated in FIG. 1.

Referring to FIG. 7, the RAM 34 comprises first and second memory areas 81 and 82. The first memory area 81 is divided into first through k-th sectors S1, S2, ..., and Sk which are specified by sector numbers (S1), (S2), ..., and (Sk), respectively. Each of the sectors is for memorizing a message piece or unit which consists of a predetermined number of, for example, ten characters. Each message may consist either of a single message piece or of a plurality of the message pieces. Anyway, each of the characters is sequentially memorized in each sector.

On the other hand, the second memory area 82 is divided into first through n-th files F1, F2, ..., and Fn which are given file numbers (F1), (F2), ..., and (Fn), respectively. The total number of the files is equal to the number of messages which is capable of being stored in the RAM 34. Each of the files is capable of memorizing eight sector numbers at the maximum in the order in which the message pieces are successively received. For example, let one message be stored in the first, the second, and the fifth sectors S1, S2, and S5. The sector numbers S1, S2, and S5 are stored in the first file F1. In the example being illustrated, the one message in the first file F1 carries information "PLEASE GO TO THE HOTEL. MR A*". The code asterisk (*) is for representing an end of the message and is therefore used as an end mark.

Figure 8:
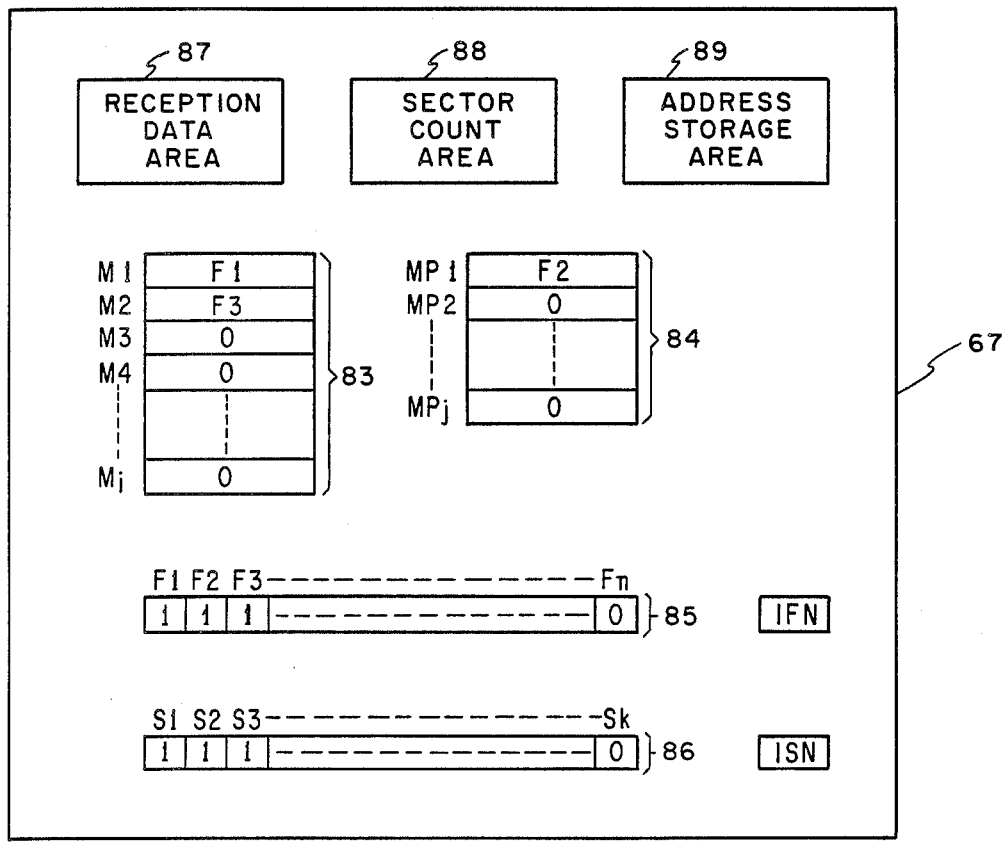
FIG. 8 shows a plurality of memory areas in a data memory of the CPU for use in the pager receiver illustrated in FIG. 1.

Referring to FIG. 8 in addition to FIG. 7, the data memory 67 comprises third, fourth, fifth, and sixth memory areas 83, 84, 85, and 86. The third memory area 83 is divided into first through i-th sections M1, M2, ..., and Mi. Each of the first through the i-th sections M1 to Mi is for memorizing one of the file numbers (F1), (F2), ..., and (Fn) that specifies each file in which at least one of the sector numbers (S1) through (Sk) is memorized. The number of the sections may be, for example, eight. All of the sections of the third memory area 83 are initially loaded with logic "0" levels as initial data. This means that no message is stored in the sections S1 through Sk of the RAM 34.

Like the third memory area 83, the fourth memory area 84 is divided into first through j-th additional sections MP1, MP2, ..., and MPj. Each of the additional sections MP1 through MPj is for preserving one of the file numbers (F1) through (Fn) that should be protected against erasure as will presently be described more in detail. It may be pointed out here that the message preserving mode is selected by a combination of the first switch 41 and the third through the fifth switches 43 to 45.

A file number memorized in the first section M1 as a previous file number, is successively shifted to the second and the following sections M2 and so forth each time when a new file number is delivered to the data memory 67 as a current file number. When the message preserving mode is selected while a particular one of the message is displayed on the display unit 35 (FIGS. 1 and 5), each file number indicative of the sector number or numbers for the particular message is transferred from a particular one of the first through the i-th sections M1 to Mi to the first additional section MP1 with the file number erased from the particular section. The file number, if any, stored in each of the second through the i-th sections M2 to Mi that follows the particular section, is shifted upwardly of FIG. 8 towards the first section M1. The file number previously stored in the first additional section MP1 is shifted towards the j-th additional section MPj each time when a new file number is transferred to the first additional section MP1. The file number which is eventually shifted to the i-th section Mi, is automatically erased.

In the example being illustrated, it is assumed that the file number (F3) is initially memorized in the first section M1 as a previous file number. Either prior to storage of the file number (F3) or thereafter, the file number (F2) is stored in the first additional section MP1. The first file number (F1) is stored in the first section M1 as a current file number with the previous file number (F3) shifted to the second section M2. In FIG. 7, the sector numbers (S10) and (S4) are stored in the third file F3 specified by the file number (F3) of the second section M2 (FIG. 8). The sector number (S3) is stored in the first additional section MP1. The sector number (S3) specifies the third sector S3 which keeps a directory number 045-932-1111. As described before, the sector numbers (S1), (S2), and (S5) are memorized in the first file F1 specified by the current file number (F1) in the first section M1.

The fifth memory area 85 comprises first through n-th bit areas which are for memorizing whether or not the first through the n-th files F1 to Fn are used, respectively. When the logic "0" level and "1" level are stored in each bit area, the corresponding file is used and unused, respectively. Accordingly, it is possible to know vacant file or files by monitoring the fifth memory area 85. As a result of monitoring, a single one of the vacant file is assigned to the current message in the manner described later again. The file number of the vacant file is stored in a file number area IFN. Thus, the fifth memory area 85 may be called a file status area and will later be represented by FSTATUS.

The sixth memory area 86 comprises first through k-th additional bit areas for memorizing whether or not the first through k-th sectors S1 to Sk are used, respectively. Use and unuse of each sector are specified by the logic "1" and "0" levels memorized in each additional bit area. Consequently, it is possible to know a vacant sector by monitoring the sixth memory area 86. Like the file number area IFN, a sector number area ISN is loaded with the sector number of the vacant sector. Like the fifth memory area 85, the sixth memory area 86 may be referred to as a sector status area and represented by SSTATUS.

Figure 9A:
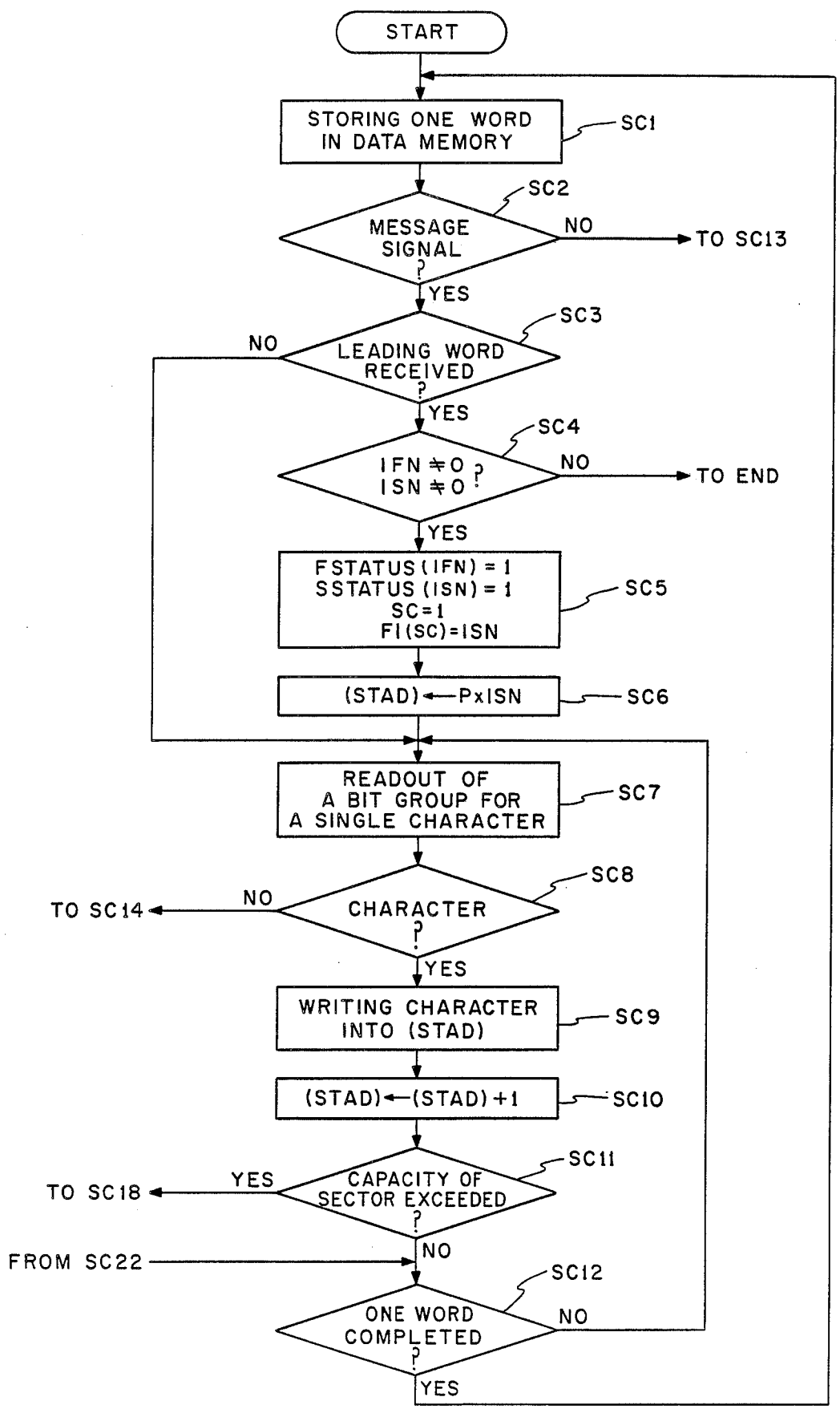
FIGS. 9(a), 9(b), and 9(c) are flow charts for use in describing operations for memorizing a decoded message in the CPU illustrated in FIG. 1.
Figure 9B:
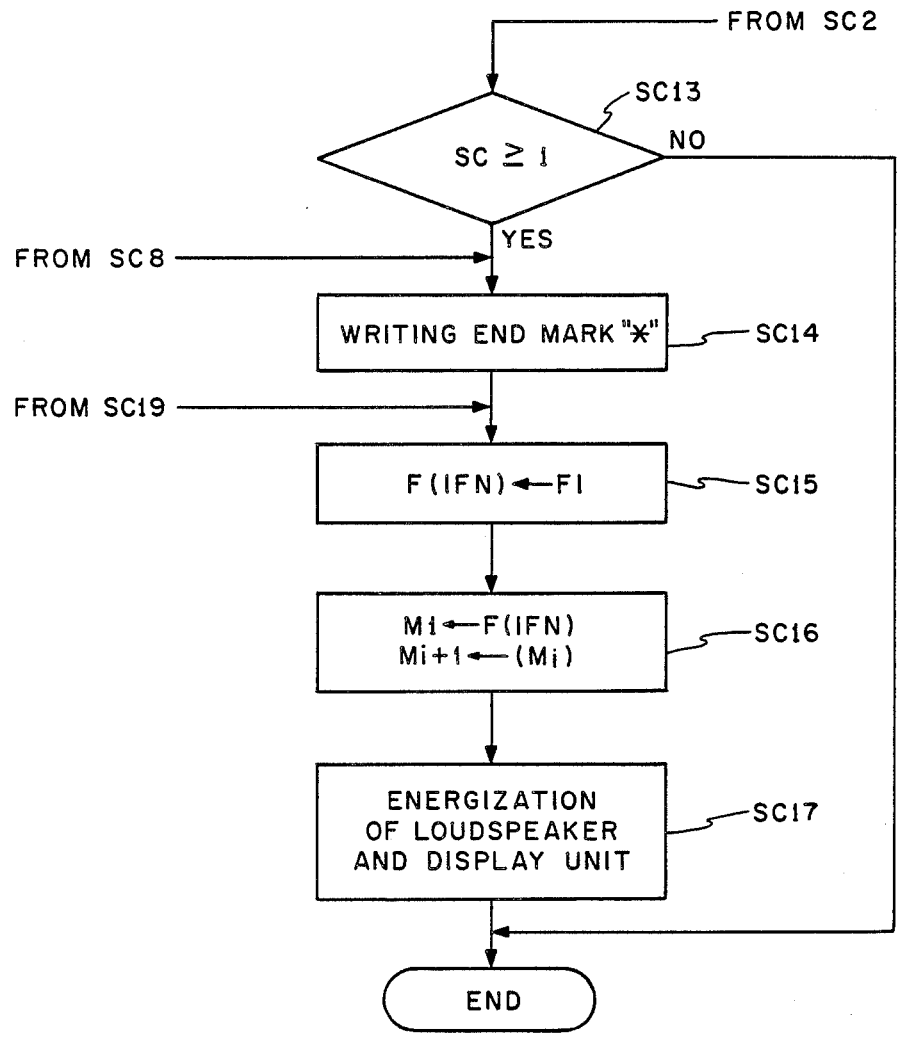
Figure 9C:
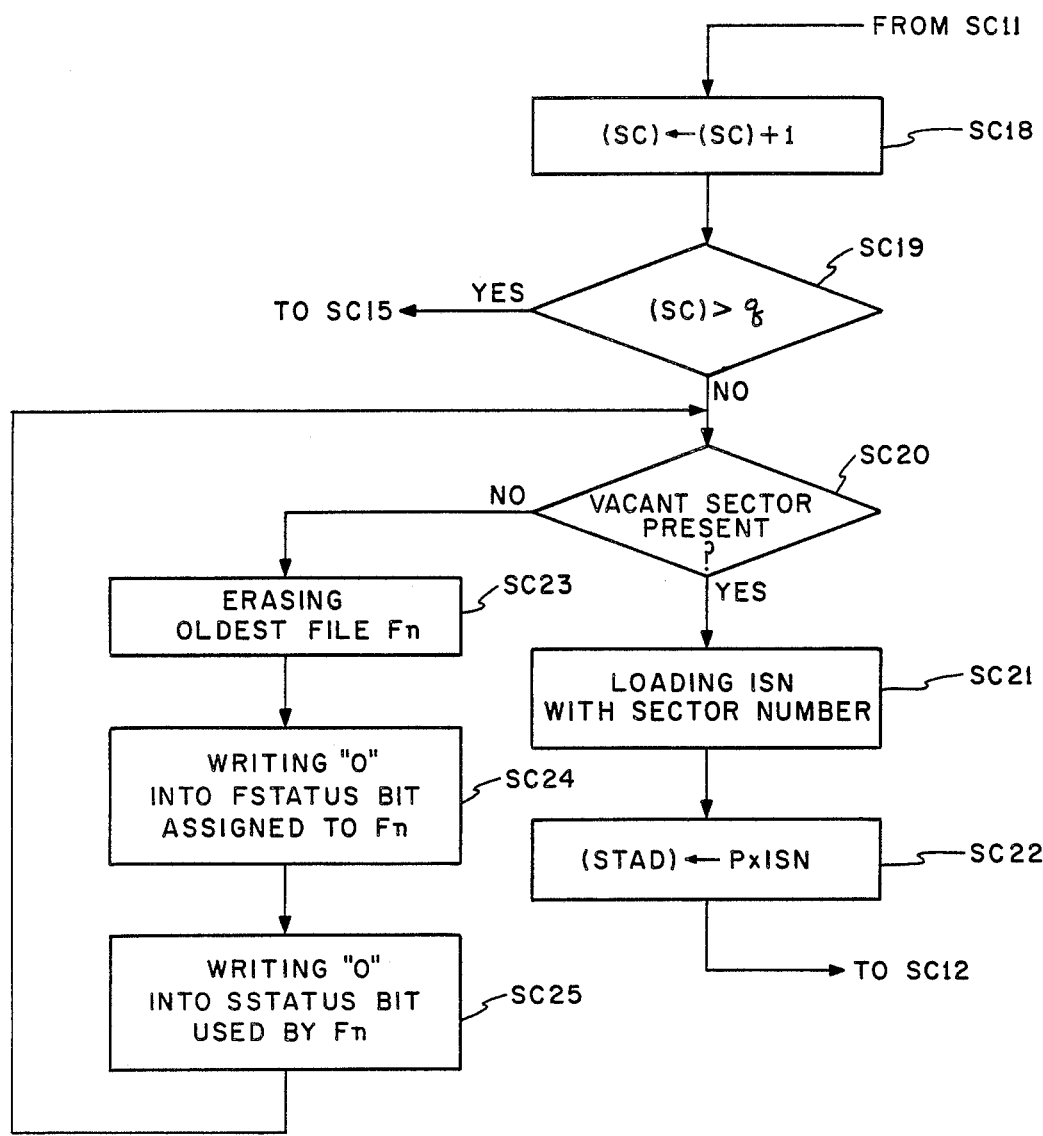

Referring to FIGS. 9(a) through (c) together with FIGS. 5, 7, and 8, description will be made so as to clarify operation for storing a received signal in the RAM 34, when the received signal is a message signal I of a word length of 32 bits. It is assumed that the file number and the sector number areas IFN and ISN are loaded with a vacant file number and a vacant sector number, respectively. The vacant file and the vacant sector numbers are specified in relation to the fifth and the sixth memory areas 85 and 86, respectively, and are therefore between 1 and n and between 1 and k, respectively.

In FIG. 9(a), operation is started and entered into a first stage SC1 for receiving the received signal and for storing the received signal in a reception data area 87 of the data memory 67. In this case, a leading one of the words of the received signal is stored in the data memory 67. This operation is possible by counting each bit of the received signal to a count of thirty-two. When the bits are counted up to 32, the first stage SC1 proceeds to a second stage SC2. The second stage SC2 is for judging whether the received signal is either the message signal or the call number signal. Such judgment is possible by monitoring the identification (ID) signal. On reception of the message signal, the second stage SC2 is followed by a third stage SC3 for detecting whether or not the leading one of the message pieces is received. Operation proceeds from the third stage SC3 to a fourth stage SC4 on the above-mentioned assumption. The vacant file number and the vacant sector number stored in the file number and the sector number areas IFN and ISN may be called an assigned file number and an assigned sector number, respectively.

At the fourth stage SC4, judgment is made whether or not each of the assigned file number and the assigned sector number is not equal to "0". Absence of the vacant file and the vacant sector is indicated by zero in each of the file and the sector number areas IFN and ISN. When either one of the file number area IFN and the sector number area ISN takes zero, the illustrated storing operation is finished into the standby state. In the example, the fourth stage SC4 proceeds to a fifth stage SC5 on the above-mentioned assumption. At the fifth stage SC5, the fifth memory area (FSTATUS) 85 is loaded with the logic "1" level at the bit area which is specified by the file number area IFN. Similarly, the sixth memory area (SSTATUS) 86 is loaded with the logic "1" level at the additional bit area which is indicated by the sector number area ISN. In addition, a sector count area (SC) 88 of the data memory 67 is loaded with unity. A count value in the sector count area 88 is counted up by one when each message signal is received. The sector count area 88 serves to monitor the number of the used sectors. Furthermore, the assigned sector number is stored into one of the files of the second memory area 82 that is indicated by the assigned file number and that is designated by FI in a box for the fifth stage SC5 and in a later stage. In the illustrated example, each file has eight positions (FIG. 7) one of which is specified by the sector count stored in the sector count area 88. Thus, the assigned sector number is stored in the specified position of the assigned file in accordance with the sector count value (SC). Thereafter, the fifth stage SC5 is followed by a sixth stage SC6.

At the sixth stage SC6, the assigned sector number stored in the sector number area ISN is multiplied by a constant value p which is determined by the number of the characters stored in each sector. A product between the assigned sector number and the constant value p provides a physical or an actual address of each sector and is stored in the address storage area as a start address STAD.

At a seventh stage SC7, a bit group predetermined for a single character is read out of the reception data area 87 in which the received message signal is stored. Each bit group consists of a preselected number of bits. The predetermined number may be, for example, seven. The seventh stage SC7 is followed by an eighth stage SC8 at which judgment is made whether or not the bit group in question specifies a character. Detection of the any character advances the eighth stage SC8 to a ninth stage SC9. At the ninth stage SC9, the bit group, namely, the character is stored in the sector designated by the start address STAD. Subsequently, the start address is increased by one in an address storage area 89 at a tenth stage SC10.

At an eleventh stage SC11, judgment is made whether or not the message exceeds the character capacity of each of the sectors. When the message can be stored in a single one of the sectors, the eleventh stage SC11 proceeds to a twelfth stage SC12 at which detection is carried out as regards completion or not of the storage operation for one word. On detection of completion, the twelfth stage SC12 returns back to the first stage SC1 so as to store the next following word in the RAM 34. Otherwise, the twelfth stage SC12 returns back to the seventh stage SC7 to repeat the operation from the seventh stage SC7 to the eleventh stage SC11 in the above-mentioned manner. As a result, the next following characters are successively stored in the RAM 34.

The program memory 61 (FIG. 5) has a program area (unnumbered) for storing first and second programs which are for assigning each character to at least one sector and for loading the second memory area 82 with each sector number, respectively. The at least one sector may be referred to as a sector set. The remaining parts of the CPU 33 except the program memory 61 serves to execute the first and the second programs and may be referred to as first and second circuits when they are operated in accordance with the first and the second programs, respectively.

In FIG. 9(b), it is assumed that any message signal is not detected at the second stage SC2. No detection of any message signal means either reception of the call number signal or reception of a predetermined end signal. On reception of the end signal, any message signal is to be stored in any sector or sectors with the assigned file number (FI) indicated by the file number area IFN. In other words, the sector count value is equal to or greater than unity on reception of the end signal. On the other hand, the sector count value (SC) is equal to zero on reception of the call number signal because no message signal accompanies the call number signal. Thus, it is possible to distinguish between the call number signal and the message signal by monitoring the sector count value.

Taking the above into consideration, the sector count value (SC) is monitored at a thirteenth stage SC13 when no message signal is detected at the second stage SC2. If the sector count value SC is not equal to zero, the end mark "*" is written next to the last one of characters carried by the message signal at a fourteenth stage SC14. Otherwise, storage operation is completed.

After write-in operation of the end mark "*", the sector number or numbers used by the message signal are written at a fifteenth stage SC15 into one of the files of the second memory area 82 that is specified by the assigned file number (FI). The one message file is represented by F(IFN) in the fifteenth stage SC15 because the one message file is specified by the file number area IFN. As a result, each file is loaded with the sector number or numbers, as shown in FIG. 7.

Thereafter, the number of the one message file, namely, the assigned file number is stored at a sixteenth stage SC16 in the first section M1 of the third memory area 83. The remaining contents (Mi) are shifted downwards in the manner described in conjunction with FIG. 8.

The program area (FIG. 5) stores a third program for carrying out the above-mentioned operation. The remaining parts of the CPU 33 except the program memory 61 will be called a third circuit when operation is carried out in accordance with the third program. At a seventeenth stage SC17, the loudspeaker 38 and the display unit 35 are energized to produce the tone and to provide visual displays. Thereafter, the storage operation is completed.

At the eleventh stage SC11 (FIG. 9(a)), let the number of characters exceed the character capacity of each sector. In this event, the assigned sector number should be changed to a new sector number and should not exceed a prescribed number q which may be equal, for example, to eight. Thus, the prescribed number q gives a maximum number of the sectors which can be stored in each file. For this purpose, the eleventh stage SC11 jumps to an eighteenth stage SC18 (FIG. 9(c)). In FIG. 9(c), the sector count value of the sector count area 88 is counted up by one to calculate a sum therebetween at the eighteenth stage SC18. The sum is compared with the prescribed number q at a nineteenth stage SC19. If the sum is less than the prescribed number q, the fifteenth stage SC15 (FIG. 9(b)) follows the nineteenth stage SC19 so as to carry out the above-mentioned operation. Otherwise, the nineteenth stage SC19 is followed by a twentieth stage SC20 for detecting another vacant sector by searching the sixth memory area 86. When another vacant sector is found at the twentieth stage SC20 as a result of the search, the sector number of another vacant sector is kept in the CPU 33 as a newly assigned number at a twenty-first stage SC21. In addition, the newly assigned number is multiplied by the constant value p at a twenty-second stage SC22 like at the sixth stage SC6. As a result, another sector address is calculated to be stored in the address storage area 89. The twenty-second stage SC22 is followed by the twelfth stage SC12.

When no vacant sector is not found at the twentieth stage SC20, the n-th file Fn is erased from the third memory area 83 at a twenty-third stage SC23. As described before, the n-th file Fn keeps an oldest one of the sector numbers. At a twenty-fourth stage SC24, the logic "0" level is put in the bit area of the fifth memory area 85 which corresponds to the oldest file number (Fn). Thereafter, all of the additional bit areas of the sixth memory area 86 are put into the logic "0" level. Next, the twenty-fifth stage SC25 returns back to the twentieth stage SC20.

It is readily possible to selectively erase the message memorized in the RAM 34 by the use of a combination of the RAM 34 and the data memory 67. More particularly, the file number which corresponds to an unnecessary message may be deleted from the third memory area 83. Likewise, the file number of the unnecessary message can be erased or detected even when the file number is stored in the fourth memory area 84. In this event, the bit signals in the fifth and the sixth memory areas 85 and 86 should be changed from "1" to "0" in each bit area which corresponds to the unnecessary message. Under the circumstances, the corresponding file number and message are also erased from the second and the first memory areas 82 and 81, respectively.

In addition, preservation or protection of each message is possible in the manner described in conjunction with FIG. 8. The program area in the program memory 61 is loaded with a fourth program for carrying out a preservation operation. In this connection, the remaining parts of the CPU 33 except the program memory 61 may be called a fourth circuit when operation is carried out in accordance with the fourth program.

Figure 10:
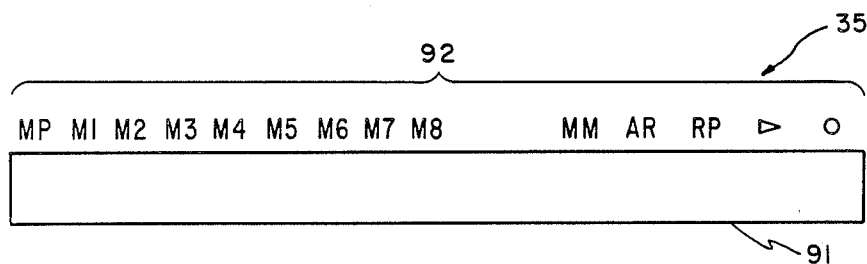
FIG. 10 is a top view of a display unit used in the pager receiver illustrated in FIG. 1.

Referring to FIG. 10 together with FIGS. 1, 7, and 8, the display unit 35 will be briefly described. The display unit 35 comprises a dot matrix 91 and an optical indicator 92 in the vicinity thereof. The dot matrix 91 may be, for example, a liquid crystal display of a seven-by-five dot matrix type and can provide visual displays of each message of up to ten characters. The optical indicator 92 is provided with a plurality of lamps for indicating symbols MP, M1 to M8, MM, AR, RP, a triangle ( ▷ ), and a circle ( ○ ). Such symbols serve to indicate various information which is necessary for the pager receiver.

The leftmost lamp MP of the optical indicator 92 indicates whether or not the message is preserved. In this embodiment, the lamp MP is illuminated only when the message is already preserved on operation of the pager receiver. The eight following lamps M1 through M8 of the optical indicator 92 correspond to the first through the i-th sections of the third memory area 83, respectively. When each message is being displayed on the display unit 91, only one of the lamps M1 through M8 is illuminated in correspondence to the message. The next lamp MM is lighted when the above-defined special mode is selected by the second switch 42 (FIG. 1). The lamp AR is luminous when the pager receiver is in a state in which the dot matrix 91 and the loudspeaker 38 should automatically stop the displays and the tone after lapse of a preselected duration of, for example, 8 seconds. The lamp RP is an ensuing lamp and is lighted when the repeat call is received. The triangular lamp is lighted when the number of the characters of the message is longer than the number which can be displayed by the dot matrix 91 at one time. The circular lamp is lighted so as to indicate selection of the special mode or the like. It will be understood that the number of the lamps may be increased if necessary.

Figure 11A:
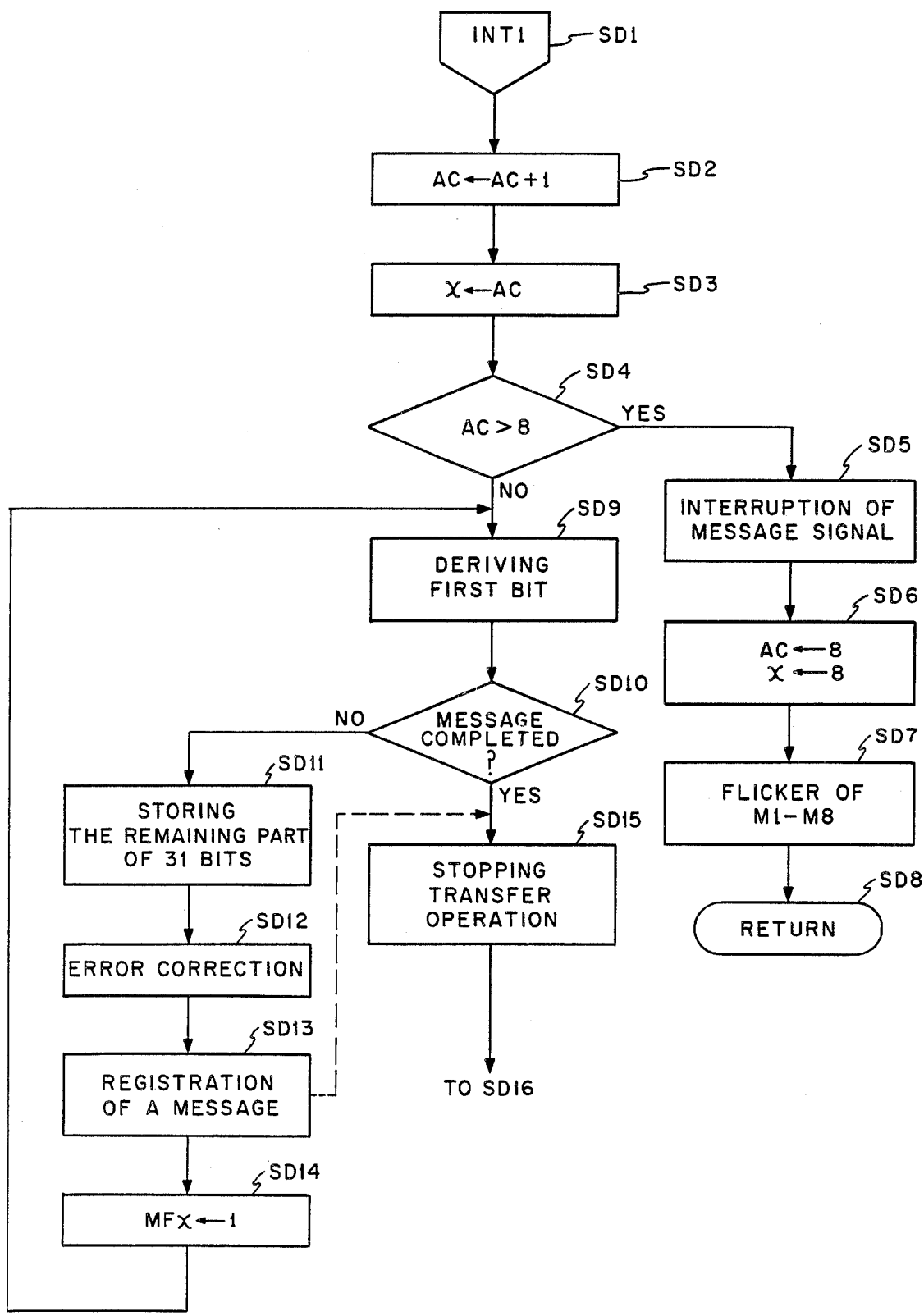
FIGS. 11(a) and 11(b) are flow charts for use in describing operation of the pager receiver illustrated in FIG. 1.

Referring to FIGS. 11(a) and (b) together with FIGS. 1 and 10, description will mainly be directed to display operation of the pager receiver illustrated in FIG. 1. The storage operation of each message signal has so far been described above. It is assumed that the RAM 34 can be loaded with eight message signals at maximum and that a message counter AC and a register x are included in the CPU 33 so as to count the number of message signals and to indicate a current one of the message signals. The current message signal arrives as an (x+1)-th one of the message signals at the pager receiver. This means that first through x-th ones of the message signals are already stored in the RAM 34 as previous message signals in the manner described with reference to FIG. 9. Such a message counter AC and a register x may be located, for example, in the data memory 67, although not shown in FIG. 5.

In FIG. 11(a), the CPU 33 is put into a first interruption state INT1 at a first stage SD1. Under the circumstances, the message counter AC is counted up by one at a second stage SD2 each time when the message signal is received as the received signal. The count of the counter AC is transferred from the counter AC to the register x at a third stage SD3, with the count kept in the counter AC.

At a fourth stage SD4 following the third stage SD3, it is judged whether or not the number of messages exceeds a predetermined number which is equal to eight in the example under consideration. When the number of the messages exceeds the predetermined number, the fourth stage SD4 proceeds to a fifth stage SD5 at which the message end command END (FIG. 5) is sent from the CPU 33 to the decoder 31 to stop reception of the message signal.

Subsequently, the number "8" is written in the counter AC and the register x at a sixth stage SD6. Under the circumstances, the lamps M1 through Mx (FIG. 10) in the optical indicator 92 are intermittently and repeatedly energized at a seventh stage SD7, to repetitively be turned on and off. In this event, all of the lamps M1 to M8 flicker to indicate an overflow of the message. The seventh stage SD7 is followed by an eighth stage SD8 from which the operation turns back to the standby state SB4 (FIG. 6).

When the number of the message signals does not exceed the predetermined number, the fourth stage SD4 is succeeded by a ninth stage SD9 for driving a first bit of each word of the message signal from the decoder 31. The first bit either specifies the message signal or the call number signal as mentioned before. Accordingly, it is possible to detect completion of the message signal by monitoring the first bit of each received signal as shown at a tenth stage SD10. While each message signal is received, the remaining part of the thirty-one bits is stored in the data memory 67 at an eleventh stage SD11. Subsequently, error correction is carried out at a twelfth stage SD12 by the use of the check bit part CK (FIG. 2) and the parity bit part EP in a usual manner.

The message signal is stored in the RAM 34 in the manner described in conjunction with FIG. 9 at a thirteenth stage SD13. Thus, each message information is registered in each sector. At a fourteenth stage SD14, a message flag area therein denoted by MF is loaded with the logic "1" level. The message flag area MF may be the fifth memory area 85. At any rate, each position of the message flag area MF is assigned to the current message specified by the register x in the manner described before. The fourteenth stage SD14 returns back to the ninth stage SD9. Thus, each word of 32 bits is successively stored in the RAM 34 as long as the message signal lasts. When the any other word of the current message signal is not received at the tenth stage SD10, the message end command END is sent from the CPU 33 to the decoder 31 at a fifteenth stage SD15 to stop transfer operation of the message signal to the RAM 34.

Figure 11B:
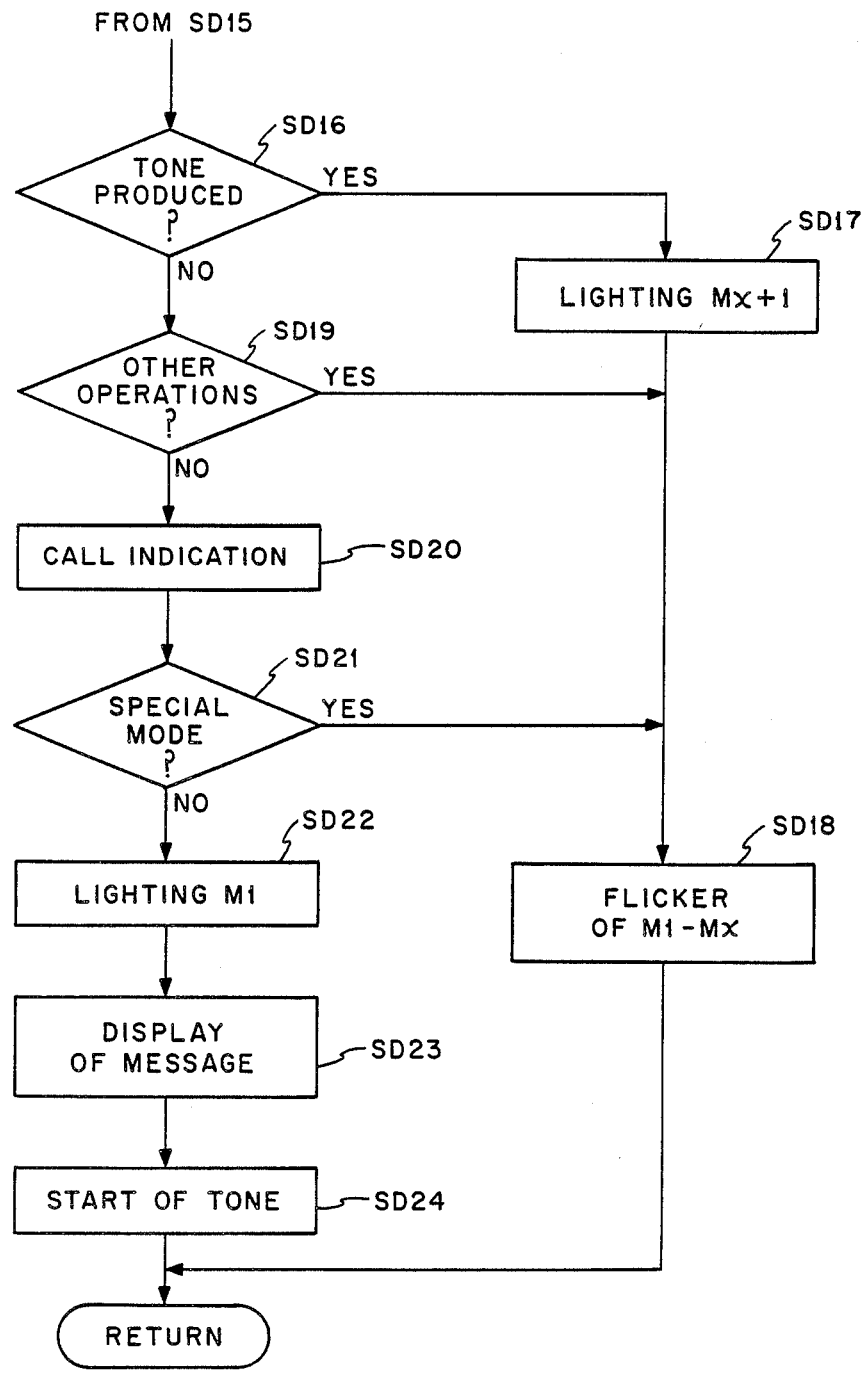

In FIG. 11(b), it is judged at a sixteenth stage SD16 whether or not the loudspeaker 38 is being driven to produce a tone. If the tone is being produced in connection with a previous message signal, the sixteenth stage SD16 proceeds to a seventeenth stage SD17. In this event, the (x+1)-th lamp Mx+1 is luminous to indicate arrival or reception of the current message signal. The lamp Mx+1 adjoins an x-th one Mx of the lamps that is already luminous. Thus, the first through (x+1)-th lamps are illuminated so as to indicate the symbols M1 to Mx+1. However, the possessor is not aware of reception of the current message signal. The lamps M1 through Mx flicker at an eighteenth stage SC18 so as to indicate reception of the current message signal. This means that the previous messages are left in the sections in the third memory area 83. Thereafter, the illustrated interruption process comes to an end. Operation returns to the standby state SB4.

Thus, the current message signal is not instantaneously displayed on the dot matrix 91 but is kept in the RAM 34 if operation is carried out in relation to one of the previous message signals by the use of the loudspeaker 38.

When the loudspeaker 38 is not driven at the sixteenth stage SD16, judgment is made at a nineteenth stage SD19 whether or not the CPU 33 is put into one of other operation modes, such as the message displaying operation mode, the message file access mode, and the operation setting mode mentioned before in conjunction with FIG. 6. Anyway, the other operation modes are related to the dot matrix 91. When one of the other operations is carried out, the nineteenth stage SD19 proceeds to the above-described eighteenth stage SD18. Accordingly, the current message signal is not displayed on the dot matrix 91 during the operation related to the dot matrix 91. Otherwise, the cirular lamp is illuminated so as to indicate a call indication at a twentieth stage SD20. Subsequently, it is judged at a twenty-first stage SD21 whether or not the special mode is selected by the second switch 42. If the special mode is selected, the twenty-first stage SD21 proceeds to the above-mentioned eighteenth stage SD18. As a result, similar indications are given by the use of the lamps M1 to Mx. If the special mode is not selected, the first lamp M1 is lit at a twenty-second stage SD22 so as to indicate reception of the current message signal. Thereafter, the current message is visually displayed on the dot matrix 91 at a twenty-third stage SD23. In this event, the loudspeaker 38 is driven to produce the tone as shown at a twenty-fourth stage SD24. After production of the tone, the interruption process comes to an end. Operation returns back to the standby state SB4.

The operations relates to the previous and the current message signals may be named first and second operations. At the sixteenth, the nineteenth, and the twenty-first stages SD16, SD19, and SD21, it is judged whether or not the first operation is still in progress. Anyway, such judgment is carried out by a well-known procedure having a program which may be called a "first preselected program" stored in the program area of the program memory 61. The CPU 33 may be called a detecting circuit for monitoring the first operation when the preselected program is executed.

At the seventeenth and the eighteenth stages SD17 and SD18, only reception of the current message signal is indicated by the use of the display unit 35 when the previous message signal is inprogress. Such an operation is carried out by a well-known procedure having a program which may be called a "second preselected program" and stored in the program area. During execution of the second preselected program, the CPU 33 may be called a processing circuit.

Figure 12:
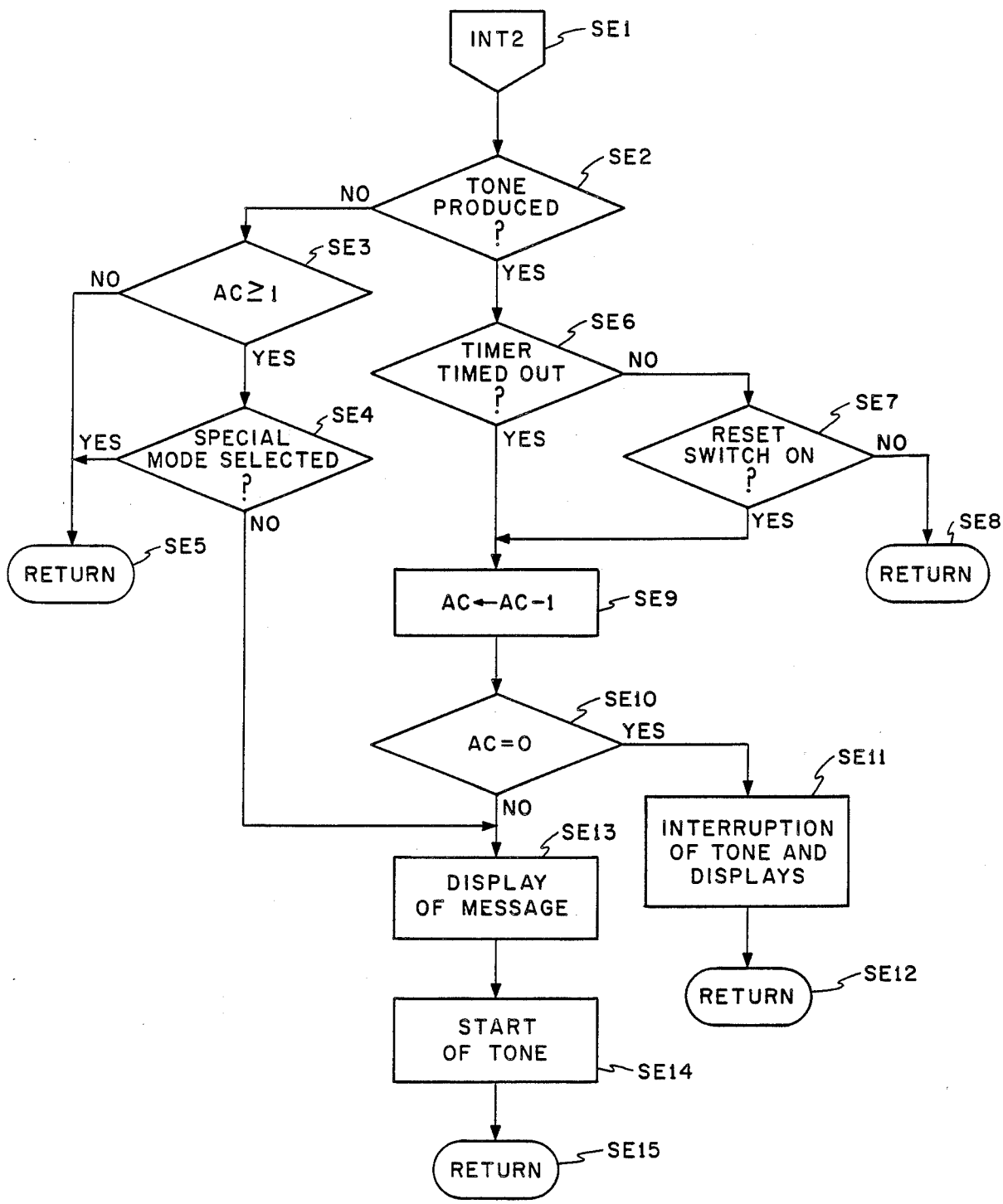
FIG. 12 is a flow chart for use in describing operation for making the display unit display the decoded message.

Referring to FIG. 12 together with FIG. 6, description will be made as regards operation for displaying each message stored in the RAM 34 in the above-mentioned other operation modes. Such a display operation is carried out during absence of the tone produced from the loudspeaker 38. The loudspeaker 38 is driven the preselected duration of, for example, 8 seconds under control of a tone control timer (not shown) which may be included in the data memory 67 (FIG. 5).

The waiting or standby state SB4 (FIG. 6) is periodically put into a second interruption INT2 which may be called a first stage SE1. The first stage SE1 is automatically shifted to a second stage SE2 for detecting whether or not the tone is being produced from the loudspeaker 38. If no tone is produced from the loudspeaker 38, the message counter AC is accessed at a third stage SE3 at which detection is carried ou whether or not any memorized message is left undisplayed. When the remaining message signal is present in the RAM 34, the third stage SE3 is succeeded by a fourth stage SE4. In the fourth stage SE4, it is judged whether or not the special mode is selected. Selection of the special mode brings about transition to a fifth stage SE5 at which operation is turned back to the standby state SB4.

Operation is also changed from the third stage SE3 to the fifth stage SE5 when no message signal is detected in the RAM 34 at the third stage SE3.

When the loudspeaker 38 is driven at the second stage SE2, the tone control timer is monitored at a sixth stage SE6 in order to detect whether or not the tone control timer is timed out as a result of lapse of the preselected duration. When the timer is not timed out, the sixth stage SE6 proceeds to a seventh stage SE7 for monitoring the first or reset switch 41. When the reset switch 41 is not depressed, the seventh stage SE7 proceeds to an eighth stage SE8 at which the pager receiver returns back to the standby state SB4. Otherwise, the seventh stage SE7 proceeds to a ninth stage SE9.

After lapse of the preselected duration or in response to depression of the reset switch 41, the message counter AC is counted down by one at the ninth stage SE9 and indicates a result of count. It is judged at a tenth stage SE10 whether or not the result of count is equal to zero. If the result of count is equal to zero, the tenth stage SE10 proceeds to an eleventh stage SE11 for interrupting the tone and the displays. Thereafter, operation returns back to the standby state SB4 as shown at a twelfth stage SE12.

A thirteenth stage SE13 succeeds either the tenth stage SE10 or the fourth stage SE4 when the result of count is not equal to zero at the tenth stage SE10 and the memory access mode is selected at the fourth stage SE4. Anyway, each message is displayed on the display unit 91 at the thirteenth stage SE13.

Thereafter, production of the tone is started at a fourteenth stage SE14 and operation returns back to the standby state SB4 as shown at a fifteenth stage SE15.

While this invention has thus far been described in conjunction with a few embodiment thereof, it will readily be possible for those skilled in the art to put this invention into practice in various other manners. For example, the decoder 31 may be designed so as to drive the loudspeaker 38 and may be provided with a circuit for producing a tone signal. The message in the radio calling signal may be of a binary coded decimal (BCD) code or a seven-bit code according to the ISO (International Organization for Standardization) Standard.

What is claimed is:

1. A pager receiver including an indicating member and capable of selectively carrying out a first operation related to a previous message signal carrying a previous message and a second operation of processing a current message signal which carries a current message and is currently received following said previous message signal, said pager receiver comprising:

production means for producing a tone on said first operation;

detecting means responsive to said current message signal for detecting whether or not said first operation is still in progress;

processing means coupled to said indicating member and operatively to said detecting means and responsive to said current message signal for carrying out said second operation to make said indicating member indicate said current message and reception of said current message signal when said first operation is not in progress, said processing means otherwise making said indicating member indicate only a reception of said current message signal and thereafter indicate said current message after progress of said first operation is over;

a first memory area having a plurality of sectors each of which is identified by a sector number and has a predetermined character capacity;

a second memory area having a plurality of files each of which is identified by a file number and is used for storing a preselected number of said sector numbers; and a third memory area having a plurality of sections which are consecutively numbered from a first section to a last section and which are used for successively storing said file numbers;

said indicating member comprising;
a display unit operatively coupled to said first and said second memory areas for displaying each of said previous and said current messages stored in at least one of said sectors of said first memory area that is specified by each of said sector numbers stored in said second memory area; and
an optical indicator operatively coupled to said processing means, said detecting means, and said third memory area for optically indicating a reception of said previous and said current messages.

2. A pager receiver as claimed in claim 1, wherein said optical indicator comprises:
a plurality of indicator elements which are equal in number to the sections of said third memory area for indicating whether or not said file numbers are present in said sections, respectively;
said processing means comprising:
means coupled to said detecting means and said indicator elements for controlling said indicator elements to make at least a part of said indicator elements flicker and to indicate only a reception of said current message signal when said current message is received during said first operation.

3. A pager receiver as claimed in claim 2, each of said previous and said current messages being composed of a plurality of characters, said pager receiver further comprising:
first means coupled to said first memory area and being responsive to each of said characters for arranging each of said characters into an assigned one of said sectors that has an assigned sector number;
second means coupled to said first means and said second memory area for loading said assigned sector number into an assigned one of said files, said assigned one of the files being determined for each of said previous and said current messages and having an assigned one of said file numbers; and
third means coupled to said second means and to said third memory area for assigning said assigned one of the file numbers to said first section of the third memory area, a previous one of the file numbers being shifted toward said last section when previously stored in said first section;
said detecting means being coupled to said first and said second memory areas and responding to the previous and the current messages which are read out of said first memory area with reference to said assigned sector number.

4. A pager receiver as claimed in claim 3, wherein said memory means further comprises:
a fourth memory area for storing a preservation file number for a specific one of said previous and said current messages that is to be preserved;
said pager receiver further comprising:
fourth means coupled to said third and said fourth memory areas for transferring a specific one of said file numbers from said third memory area to said fourth memory area as said preservation file number;
said detecting means being also coupled to said fourth means.

* * * * *